US010592137B1

(12) United States Patent
Khokhar et al.

(10) Patent No.: US 10,592,137 B1
(45) Date of Patent: Mar. 17, 2020

(54) METHOD, APPARATUS AND COMPUTER PROGRAM PRODUCT FOR DETERMINING RESPONSE TIMES OF DATA STORAGE SYSTEMS

(71) Applicant: EMC IP HOLDING COMPANY LLC, Hopkinton, MA (US)

(72) Inventors: Muzhar S. Khokhar, Shrewsbury, MA (US); Shyam Reddy, Westborough, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 312 days.

(21) Appl. No.: 15/494,929

(22) Filed: Apr. 24, 2017

(51) Int. Cl.
*G06F 3/06* (2006.01)
*G06F 12/0891* (2016.01)

(52) U.S. Cl.
CPC ........... *G06F 3/0629* (2013.01); *G06F 3/061* (2013.01); *G06F 3/0653* (2013.01); *G06F 3/0659* (2013.01); *G06F 12/0891* (2013.01); *G06F 2212/60* (2013.01)

(58) Field of Classification Search
CPC ...... G06F 3/061; G06F 3/0629; G06F 3/0653; G06F 3/0659; G06F 12/0891; G06F 2212/60
See application file for complete search history.

(56) References Cited

U.S. PATENT DOCUMENTS

| 6,311,144 | B1* | 10/2001 | Abu El Ata | G06F 17/10 |
| | | | | 703/2 |
| 7,292,969 | B1* | 11/2007 | Aharoni | G06F 11/3419 |
| | | | | 703/21 |
| 9,372,636 | B1* | 6/2016 | Zeryck | G06F 11/3034 |
| 10,133,513 | B1* | 11/2018 | Agans | G06F 3/0659 |
| 2003/0208284 | A1* | 11/2003 | Stewart | G05B 13/024 |
| | | | | 700/30 |
| 2009/0158275 | A1* | 6/2009 | Wang | G06F 9/5077 |
| | | | | 718/1 |
| 2009/0276202 | A1* | 11/2009 | Susarla | H04L 41/145 |
| | | | | 703/21 |
| 2012/0054245 | A1* | 3/2012 | Colle | G06F 16/214 |
| | | | | 707/792 |

(Continued)

*Primary Examiner* — Larry T Mackall
(74) *Attorney, Agent, or Firm* — Krishnendu Gupta; Nikhil Patel

(57) ABSTRACT

Techniques are disclosed for use in determining response times of data storage systems. In one embodiment, there is disclosed a method. The method comprises defining a data storage system being designed. The method also comprises defining a first workload for the data storage system. The first workload including a first IOPS (input-output operations per second) requirement and respective percentages of read and write IO (input-output) requests. The method also comprises applying the first workload to the data storage system, thus defining a IO request queue length. The method further comprises determining a response time for handling an IO request at the data storage system, wherein the said determination is based on the IO request queue length, the respective percentages of read and write IO requests, a service time relating to servicing of an IO request by a data storage device of the data storage system, a read cache hit response time and a write cache hit response time associated with a cache of the data storage system.

16 Claims, 3 Drawing Sheets

(56) References Cited

U.S. PATENT DOCUMENTS

| | | | |
|---|---|---|---|
| 2012/0198152 A1* | 8/2012 | Terry | G06F 11/2094 |
| | | | 711/114 |
| 2013/0179753 A1* | 7/2013 | Flynn | G06F 12/0253 |
| | | | 714/773 |
| 2014/0006358 A1* | 1/2014 | Wang | G06F 16/21 |
| | | | 707/687 |
| 2019/0042386 A1* | 2/2019 | Barczak | G06F 11/3433 |

* cited by examiner

METHOD, APPARATUS AND COMPUTER PROGRAM PRODUCT FOR DETERMINING RESPONSE TIMES OF DATA STORAGE SYSTEMS

TECHNICAL FIELD

The present invention relates to data storage. More particularly, the present invention relates to a method, an apparatus and a computer program product for determining response times of data storage systems.

BACKGROUND OF THE INVENTION

Data storage systems are arrangements of hardware and software that include storage processors coupled to arrays of non-volatile storage devices, such as magnetic disk drives, electronic flash drives, and/or optical drives, for example. The storage processors service storage requests, arriving from host machines ("hosts") which specify files or other data elements to be written, read, created, deleted, and so forth. Software running on the storage processors manages incoming storage requests and performs various data processing tasks to organize and secure the data elements stored on the non-volatile storage devices.

Some data storage systems use an assortment of data storage devices. Such data storage devices may have different performance characteristics and may be provided in respective storage tiers, with each storage tier including multiple storage devices that have similar characteristics. Each storage tier may contain a certain amount of data storage capacity, e.g., measured in gigabytes, terabytes, etc., and may include some number of storage drives to meet that capacity. As used herein, a "storage drive" is a physical device that stores data, such as an electronic flash drive, a SAS (Serial Attached SCSI—Small Computer System Interface) drive, an NL-SAS (Near Line SAS) drive, or a SATA (Serial Advanced Technology Attachment) drive, for example.

Performance of the data storage system may be characterized by the systems total capacity, response time, and throughput. The capacity is the maximum total amount of data that can be stored on the system. The response time is the amount of time that it takes to read data from or write data to the system. The throughput is a measure of the amount of data that can be transferred into or out of (i.e., written to or read from) the system over a given period of time.

The administrator of the system may desire to operate the system in a manner that maximizes throughput and minimizes response time, hi general, performance may be constrained by both physical and temporal constraints. Examples of physical constraints include bus occupancy and availability, excessive disk arm movement, and uneven distribution of load across disks. Examples of temporal constraints include bus bandwidth, bus speed, spindle rotational speed, serial versus parallel access to multiple read/write heads, and the size of data transfer buffers.

One factor that may limit the performance of a storage system is the performance of each individual storage component. For example, the read access time of a data storage system is constrained by the access time of the disk drive from which the data is being read. Read access time may be affected by physical characteristics of the disk drive, such as the number of revolutions per minute of the spindle: the faster the spin, the less time it takes for the sector being read to come around to the read/write head. The placement of the data on the platter also affects access time, because it takes time for the arm to move to, detect, and properly orient itself over the proper track (or cylinder, for multihead/multiplatter drives). Reducing the read/write arm swing reduces the access time. Finally, the type of drive interface may have a significant impact on overall storage system. For example, a multihead drive that supports reads or writes on all heads in parallel will have a much greater throughput than a multihead drive that allows only one head at a time to read or write data.

Unfortunately, the above issues relating to performance may not be known until the storage system is designed. This task of designing or configuring the storage system is complex and time consuming and the effort will be wasted if the performance of the storage system is not satisfactory. In addition, further time and expense will be required to address the matter when attempting to improve the performance of the storage system. This is undesirable.

SUMMARY OF THE INVENTION

There is disclosed a method, comprising: defining, by processing circuitry, a data storage system being designed; defining, by processing circuitry, a first workload for the data storage system, wherein the first workload includes a first TOPS (input-output operations per second) requirement and respective percentages of read and write IO (input-output) requests; applying, by processing circuitry, the first workload to the data storage system, thus defining a IO request queue length; and determining, by processing circuitry, a response time for handling an IO request at the data storage system, wherein the said determination is based on the IO request queue length, the respective percentages of read and write IO requests, a service time relating to servicing of an IO request by a data storage device of the data storage system, a read cache hit response time and a write cache hit response time associated with a cache of the data storage system.

There is also disclosed an apparatus, comprising: memory; and processing circuitry coupled to the memory, the memory storing instructions which, when executed by the processing circuitry, cause the processing circuitry to: define a data storage system being designed; define a first workload for the data storage system, wherein the first workload includes a first IOPS (input-output operations per second) requirement and respective percentages of read and write IO (input-output) requests; apply the first workload to the data storage system, thus defining a IO request queue length; and determine a response time for handling an IO request at the data storage system, wherein the said determination is based on the IO request queue length, the respective percentages of read and write IO requests, a service time relating to servicing of an IO request by a data storage device of the data storage system, a read cache hit response time and a write cache hit response time associated with a cache of the data storage system.

There is also disclosed a computer program product including a set of non-transitory, computer-readable media having instructions which, when executed by processing circuitry, cause the processing circuitry to perform a method, the method comprising: defining a data storage system being designed; defining a first workload for the data storage system, wherein the first workload includes a first IOPS (input-output operations per second) requirement and respective percentages of read and write IO (input-output) requests; applying the first workload to the data storage system, thus defining a IO request queue length; and determining a response time for handling an IO request at the data storage system, wherein the said determination is based on the IO request queue length, the respective percentages of read and write IO requests, a service time relating to servicing of an IO request by a data storage device of the data storage system, a read cache hit response time and a write cache hit response time associated with a cache of the data storage system.

BRIEF DESCRIPTION OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION

Figure 1:
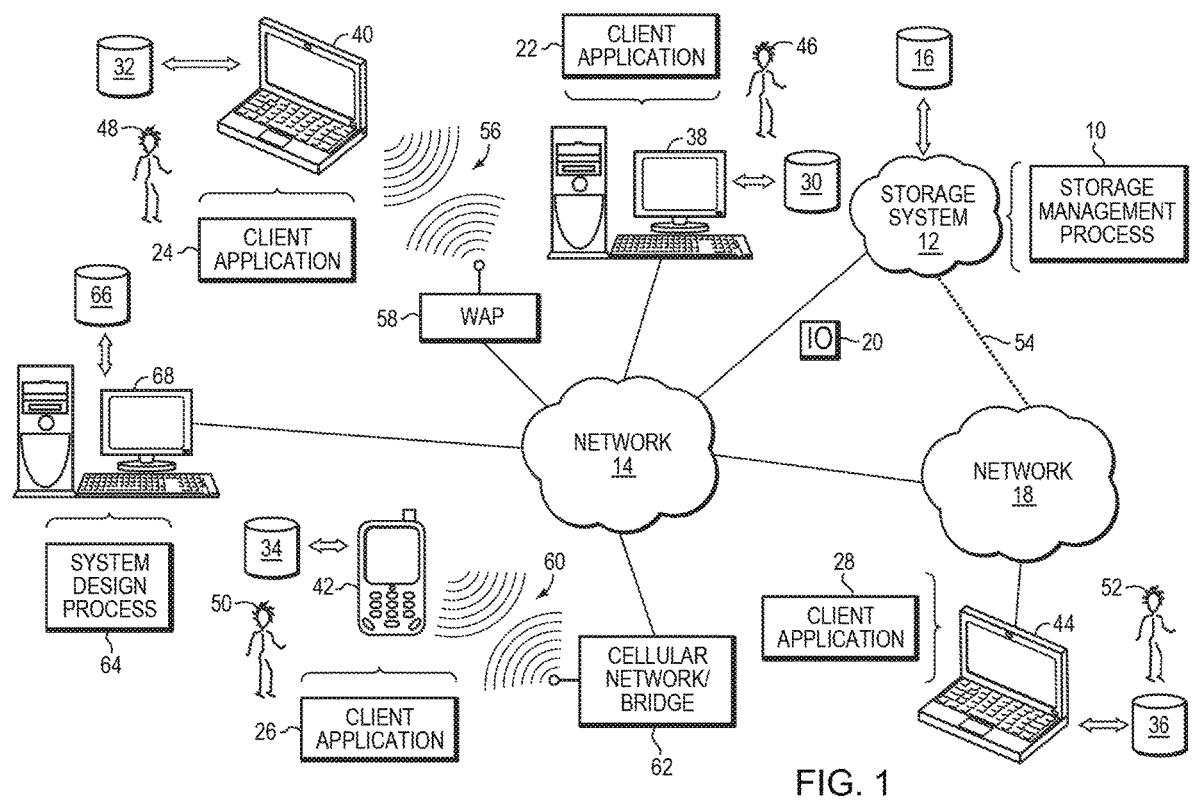
FIG. 1 is a diagrammatic view of a storage system, a storage management process, and a system design process coupled to a distributed computing network.

Referring to FIG. 1, there is shown storage management process 10 that may reside on and may be executed by storage system 12, which may be connected to network 14 (e.g., the Internet, a local area network, or a storage area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows 2003 Server™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

For illustrative purposes, storage system 12 will be described as being a network-based storage system that includes a plurality of electro-mechanical backend storage devices. However, this is for illustrative purposes only and is not intended to be a limitation of this disclosure, as other configurations are possible and are considered to be within the scope of this disclosure.

Figure 2:
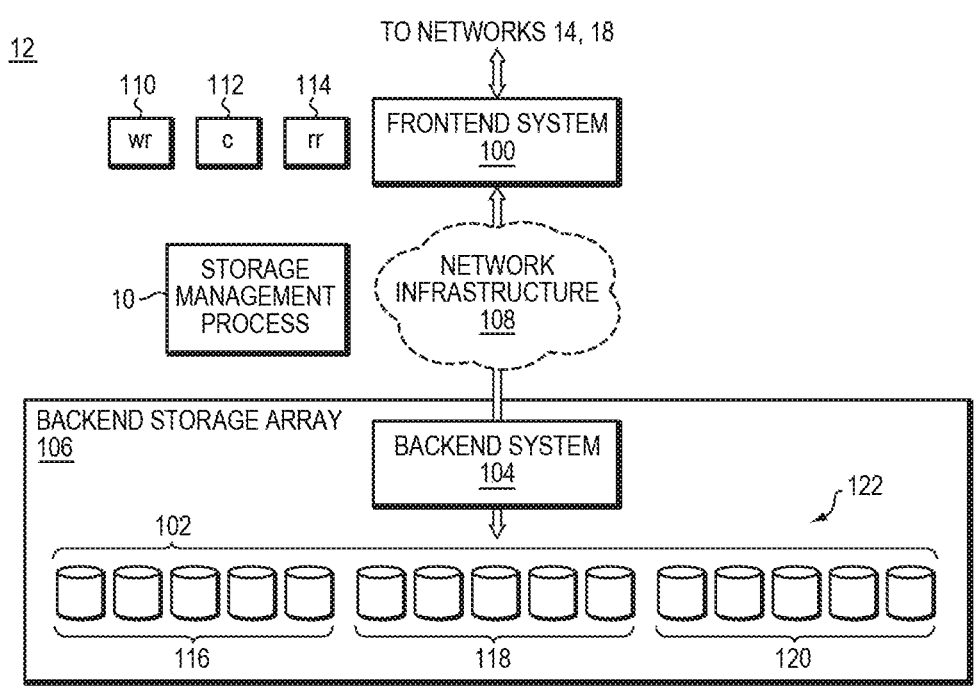
FIG. 2 is a diagrammatic view of the storage system of FIG. 1.

Referring also to FIG. 2, storage system 12 may include frontend system 100 and plurality of storage targets 102. The quantity of storage targets included within plurality of storage targets 102 may be increased or decreased depending upon e.g. the level of redundancy/performance/capacity required.

Plurality of storage targets 102 may be configured to provide various levels of performance and/or high availability. For example, a portion of plurality of storage targets 102 may be configured as a RAID 0 array, in which data is striped across storage targets. By striping data across a plurality of storage targets, improved performance may be realized. However, RAID 0 arrays do not provide a level of high availability. Accordingly, a portion of plurality of storage targets 102 may be configured as a RAID 1 array, in which data is mirrored between storage targets. By mirroring data between storage targets, a level of high availability is achieved as multiple copies of the data are stored within storage system 12.

While plurality of storage targets 102 is discussed above as being configured in a RAID 0 or RAID 1 array, this is for illustrative purposes only and is not intended to be a limitation of this disclosure, as other configurations are possible. For example, plurality of storage targets 102 may be configured as a RAID 3, RAID 4, RAID 5 or RAID 6 array.

Plurality of storage targets 102 may include one or more coded targets. As is known in the art, a coded target may be used to store coded data that may allow for the regeneration of data lost/corrupted on one or more of plurality of storage targets 102. An example of such a coded target may include but is not limited to a hard disk drive that is used to store parity data within a RAID array. The quantity of coded targets included within plurality of storage targets 102 may be increased or decreased depending upon e.g. the level of redundancy/performance/capacity required.

Examples of plurality of storage targets 102 may include one or more electro-mechanical hard disk drives and/or solid-state/Flash devices, wherein the combination of plurality of storage targets 102 and processing/control systems (e.g., backend system 104) may form backend storage array 106.

The manner in which storage system 12 is implemented may vary depending upon e.g. the level of redundancy/performance/capacity required. For example, storage system 12 may be a RAID device, in which first frontend system 100 is a RAID controller card and plurality of storage targets 102 are individual "hot-swappable" hard disk drives. An example of such a RAID device may include but is not limited to an NAS device. Alternatively, storage system 12 may be configured as a SAN, in which first frontend system 100 may be e.g., a server computer and each of plurality of storage targets 102 may be a RAID device and/or computer-based hard disk drive. Further still, one or more of plurality of storage targets 102 may be a SAN.

In the event that storage system 12 is configured as a SAN, the various components of storage system 12 (e.g. first frontend system 100, plurality of storage targets 102, and backend system 104) may be coupled using network infrastructure 108, examples of which may include but are not limited to an Ethernet (e.g., Layer 2 or Layer 3) network, a fiber channel network, an InfiniBand network, or any other circuit switched/packet switched network.

Storage system 12 may execute all or a portion of storage management process 10. The instruction sets and subroutines of storage management process 10, which may be stored on a storage device (e.g., storage device 16) coupled to first frontend system 100, may be executed by one or more processors (not shown) and one or more memory architectures (not shown) included within first frontend system 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IQ request 20) may be generated. For example, these IO requests may be sent from client applications 22, 24, 26, 28 to storage system 12. Additionally/alternatively and when first frontend system 100 is configured as an application server, these IO requests may be internally generated within first frontend system 100. Examples of IO request 20 may include but are not limited to data write request 110 (i.e. a request that content 112 be written to storage system 12) and data read request 114 (i.e. a request that content 112 be read from storage system 12).

During operation of first frontend system 100, content 112 to be written to storage system 12 may be processed by first frontend system 100. Additionally/alternatively and when first frontend system 100 is configured as an application server, content 112 to be written to storage system 12 may be internally generated by first frontend system 100.

As discussed above, the instruction sets and subroutines of storage management process 10, which may be stored on storage device 16 included within storage system 12, may be executed by one or more processors (not shown) and one or more memory architectures (not shown) included within storage system 12. Accordingly, in addition to being executed on first frontend system 100, some or all of the instruction sets and subroutines of storage management process 10 may be executed by one or more processors (not shown) and one or more memory architectures (not shown) included within backend system 104 of backend storage array 106.

Plurality of storage targets 102 may be divided into a plurality of storage tiers (e.g., storage tiers 116, 118, 120) within auto-tiering system 122, wherein each of these storage tiers may provide a different level of performance. For example, storage tier 116 within auto-tiering system 122 may utilize flash-based storage targets (and provide high-level performance); storage tier 118 within auto-tiering system 122 may utilize SAS-based storage targets (and provide mid-level performance) and storage tier 120 within auto-tiering system 122 may utilize NL/SAS-based storage targets (and provide low-level performance).

The design and implementation of storage system 12 may be a complex task that may require the prediction of the manner in which system 12 may perform (prior to the purchase and installation of system 12). Accordingly, various design tools (e.g., system design process 64) may be utilized to design/implement storage system 12.

The instruction sets and subroutines of system design process 64, which may be stored on storage device 66 included within computing system 68, may be executed by one or more processors (not shown) and one or more memory architectures (not shown) included within computing system 68. Computing system 68 may be coupled to network 14. Storage device 66 may include but is not limited to: a hard disk drive; a tape drive; an optical drive; a RAID device; a random access memory (RAM); a read-only memory (ROM); and all forms of flash memory storage devices.

Figure 3:
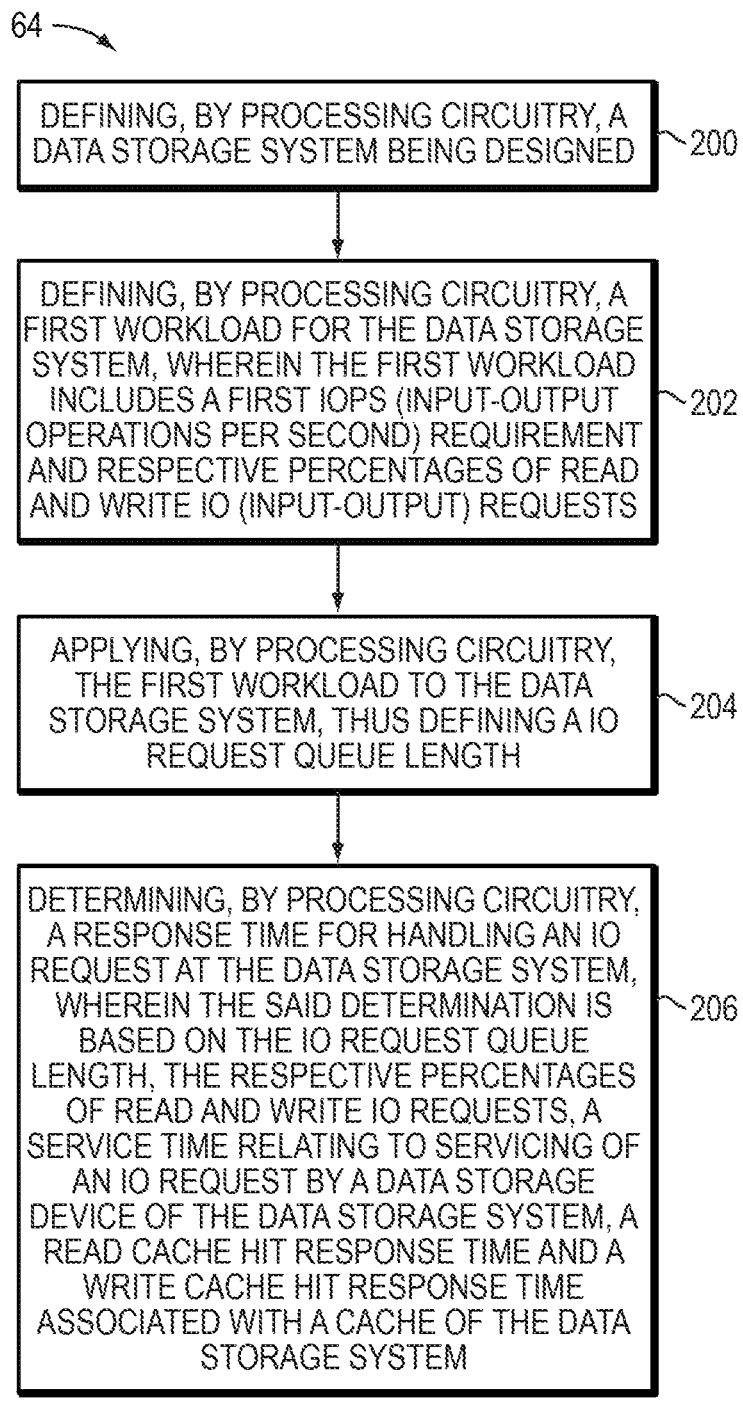
FIG. 3 is a flow chart of one implementation of the system design process of FIG. 1.

Referring also to FIG. 3, when designing a storage system (e.g., storage system 12), system design process 64 may be used to define 200 a storage system (e.g., storage system 12) being designed. For example, in one embodiment, the storage system as defined may include a storage pool having a plurality of storage tiers (e.g., storage tiers 116, 118, 120), wherein each storage tier has a different level of performance. As discussed above, storage tier 116 within auto-tiering system 122 may utilize flash-based storage targets (and provide high-level performance); storage tier 118 within auto-tiering system 122 may utilize SAS-based storage targets (and provide mid-level performance) and storage tier 120 within auto-tiering system 122 may utilize NL/SAS-based storage targets (and provide low-level performance).

System design process 64 may also define 202 a first workload for the storage system, wherein the first workload 72 includes: a first IOPS requirement (e.g., 10,000 IOPS) that indicates the number of Input/Output operations per second that the workload requires and respective read and write percentages (e.g., 80% write, 20% read).

It should be understood that the first workload described above may be designed to simulate real-world workloads that may be placed on the system being designed (e.g., storage system 12). Accordingly, the first workload may be defined based upon historical customer information. For example, if the customer for which storage system 12 is being designed has a history of running a certain accounting application and they know the requirements of that accounting application and the manner in which it loads their current storage system, such data may be utilized to build first workload described above, which may be processed by system design process 64.

Alternatively, in another embodiment, the first workload may be defined based upon default application information. For example, if the customer for which storage system 12 is being designed is building storage system 12 to run a certain database application that they are not currently running, default information concerning this database application may be used to build first workload described above, which may be processed by system design process 64.

Moreover, it should be understood that in other embodiments the customer may provide details in connection with the first workload such that the first workload can be defined. The customer may, for example, be a storage administrator skilled in the art and be knowledgeable with respect to the workload. The storage administrator will in such cases provide the first IOPS requirement, the respective read and write percentages, etc.

System design process 64 may apply 204 first workload 72 to the data storage system, thus defining a IO request queue length. For example, in one particular embodiment, the step 204 involves generating a first value corresponding to a ratio of the first IOPS requirement to a total potential IOPS associated with one or more data storage devices of the data storage system. This first value may be described as a disk utilization value. The step 204 also involves determining a second value corresponding to a ratio of the first value to one minus the first value. Thus, the IO request queue length is defined as a numerical value. The second value equates to the IO request queue length in at least one embodiment.

However, it should be appreciated that in one or more embodiments the step 204 involves generating the first and second values as discussed above and subsequently comparing the first value to a first threshold. If the first value is determined to be greater than the first threshold, a third value corresponding to a base ten logarithm of the second value is generated. Next, a fourth value is generated corresponding to a factors time the third value. Finally, a fifth value is determined corresponding to the fourth value minus one. The fifth value equates to the IO request queue length in this embodiment when the first value is determined to be greater than the first threshold.

Additionally, it should be understood that in one or more embodiments the data storage system comprises solid state devices for handling IO requests, hi such embodiments, the step 204 involves reducing the read IO percentage by a factors time the read IO percentage and reducing the write IO percentage by a factors time the write IO percentage. The step 204 also involves summing the reduced read IO percentage and the reduced write IO percentage. The step 204 further involves determining a third value corresponding to a product of the summed IO percentage and the second value. The third value equates to the IO request queue length in this embodiment when the solid state devices handle IO requests.

Furthermore, it should be understood that in one or more embodiments, the system design process 64 may also determine whether the IO request queue length is greater than a cache flush threshold. The cache flush threshold representing a level at which the cache flushes data therefrom. When the IO request queue length is greater than the cache flush threshold, the IO request queue length is increased by a factors time the IO request queue length.

System design process 64 may also determine 206 a response time for handling an IO request at the data storage system. The said determination is based on the IO request queue length, the respective percentages of read and write IO requests, a service time relating to servicing of an IO request by a data storage device of the data storage system, a read cache hit response time and a write cache hit response time associated with a cache of the data storage system.

In one embodiment, the step 206 involves generating a disk response time corresponding to a product of the service time and one plus the IO request queue length. The step 206 further involves generating a read response time corresponding to a product of the read IO requests percentage and the read cache hit response time and one minus a read cache hit percentage and the disk response time. Tire step 206 further involves determining the response time includes generating a write response time corresponding to the write cache hit response time. The step 206 further involves producing a product of the write response time and the write IO requests percentage and summing the product with the read response time to produce the response time.

As will be appreciated from the above, the system design process 64 may involve a number of different steps. The steps involved may include:

1) Take System utilization and Disk utilization values of a storage pool as input. For example:
    ➢ Disk utilization=(Total Disk IGPS required for a workload/Total potential IOPS possible by all drives in a pool).
    ➢ System utilization=(Total IOPS generated by a load/Total system IOPS possible by the system)
2) Calculate total System utilization based on all pools in the system.
3) Calculate Disk queue length (average queue depth) using Disk utilization.
    ➢ Queue length=(disk utilization/(1−disk utilization))
4) Adjust queue length using logarithmic curve if the disk utilization greater than 85%.
    ➢ Queue length=(log 10(Queue length)*13)−1
5) Perform calibration on queue length if required.
6) If SSD drives then adjust Queue length by reducing the Queue length. Write queue length by 30% and Read queue length by 50%.
    ➢ Queue length=Queue length*(read IO %*0.50+write IO %*0.70)
7) If above calculated Queue length is higher than watermark (Unity Sizer defaults to queue length 8) value, then adjust Queue length by increasing Queue length maximum by 50%,
8) Calculate Disk response time based on the Average disk service time. Average disk service time is calculated during the Disk utilization calculations.
    ➢ Disk response time=Average disk service time*(1+ Queue length)
    It should be noted that if the Queue length is adjusted as per any one of steps 4, 6 or 7 then it is the adjusted Queue length that is used in the above calculation of the disk response time. If two or more of the steps 4, 6 or 7 are applied then it will be the adjusted Queue length calculated in the latest step that will be used in step 8 (i.e., the adjusted Queue length from step 7 will be used if the two or more steps include step 7, the adjusted Queue length from step 6 will be used if only steps 4 and 6 apply, etc.).

9) Take minimum read and write cache hit response time from the performance test results based on the system type. These are all constant values based on the performance test and stored in lookup table.
10) Adjust base read, write and average response time values based on disk response time and read write cache hit percentage. As write cache is enabled by default in this storage system, the Write response time base value is not adjusted. Only reads are adjusted.
   ➢ Read response time=read IO %*Read cache hit response time*(1−read cache hit %)*Disk response time
   ➢ Write response time=Write cache hit response time
   ➢ Average response time=(Read response time+(write IO %*Write response time))
11) Adjust values based on different Bottlenecks.
12. Adjust based on storage processor utilization effect.
   a. Cache efficiency threshold is around 70%, If storage processor utilization is greater than 70%, then calculate by how much,
   b. Derive effect from a logarithmic curve. The curve will be different for different storage array. For example:
      ➢ Effect=−5*log 10(1−storage processor utilization increase factor)
   c. Adjust based on Force flush effects on Cache. SSD drives no effect, SAS drives by 20% and NL-SAS drives by 40%.
   d. We cannot have more than 100% flush rates. Adjust response time based on the results.
   Adjust the response time if it reaches above the threshold utilization. More than 75% of disk utilization may lead to higher response time. For example:
      ➢ Effect=−10*log 10(1−disk utilization increase factor)
13. Start calibration based on IO size, system utilization, disk utilization and disk count.
14. Adjust based on Random write bandwidth and Sequential write bandwidth for large IO size. Increase the response time linearly with IO size.
15. If it is large random IO size then it will have huge increase in response time, then adjust based on the test results.
16. If misaligned, then increase the random write bandwidth adjustment factor by 100%.
17. Apply calibration based on read and write percentages and system utilization. During the calibration, take the difference from the test result and estimated values from above and then identify a suitable logarithm curve to roughly match the differences. Use those logarithm values to adjust the estimated value above.
18. Perform calibration as described above and adjust below response time factors.
   ➢ Random write adjustment factor=sum (storage processor utilization effect on random writes+disk utilization effect on random writes)
   ➢ Random read adjustment factor=sum (storage processor utilization effect on random reads+disk utilization effect on random reads)
   ➢ Sequential write adjustment factor=sum (storage processor utilization effect on sequential writes+disk utilization effect on sequential writes)
   ➢ Sequential read adjustment factor=sum (storage processor utilization effect on sequential reads+disk utilization effect on sequential reads)
19. Consider Meta IOPS response time.
   ➢ Meta IOPS response time=Queue length*net Meta IOPS service time
   It should be noted that the Queue length used in the above calculation of the Meta IOPS response time is the Queue length generated as per step 3 above regardless of whether it is adjusted subsequently in steps 4, 6 or 7.
20. Adjust below factors.
   ➢ Random write adjustment factor+=(Meta IOPS response time*12)
   ➢ Sequential read adjustment factor+=Meta IOPS response time
   ➢ Sequential write adjustment factor+=Meta IOPS response time
   ➢ Random read adjustment factor+=Meta IOPS response time
21. Calculate total read and write adjustment factors.
   ➢ Total write Adjustment factor=(Random write adjustment factor*random write %)+(Sequential write adjustment factor*sequential write %)
   ➢ Total read adjustment factor=(Random read adjustment factor*random read %)+(Sequential read adjustment factor*sequential read %)
22. Calculate read, write and average response times.
   ➢ Read response time+=Total read adjustment factor
   ➢ Write response time+=Total write adjustment factor
   ➢ Average response time+=(Total read adjustment factor)+(Total write adjustment factor)

It should be appreciated that the steps 1 to 22 of the process 64 may estimate the response time at each storage tier level in a storage pool and then based on a IOPS ratio it takes weighted average of response time across all tiers to calculate final pool level response time. For example, suppose there is three respective tiers in the storage pool comprising flash storage and SAS storage and NL-SAS storage, the pool level response time may be estimated as follows:
   ➢ Pool level Response Time=((Flash response time*Flash tier IOPS)+(SAS response time*SAS tier IOPS)+(NL-SAS response time*NL-SAS IOPS))/(Flash Tier IOPS+SAS Tier IOPS+NL-SAS Tier IOPS)

Description of techniques for allocating IOPS between tiers can be found, for example, in U.S. patent application Ser. No. 15/460,533, entitled "METHOD, APPARATUS AND COMPUTER PROGRAM PRODUCT FOR CONFIGURING A DATA STORAGE SYSTEM", filed on Mar. 16, 2017, and U.S. patent application Ser. No. 15/394,134, entitled "CONFIGURING A DATA STORAGE SYSTEM BASED ON WORKLOAD SKEW", filed on Dec. 29, 2016, both incorporated by reference herein in their entirety.

In use, the above process 64 as described with respect to steps 1 to 22 can be explained in further detail in the below example.

Lab Test Results:

| name | IOPS | Avg. RT (ms) |
| --- | --- | --- |
| 48TA_random_16Thd_60GB_4R_1W_8KB | 10105 | 0.481 |
| 48TA_random_16Thd_60GB_4R_1W_8KB | 20205 | 0.468 |
| 48TA_random_16Thd_60GB_4R_1W_8KB | 30712 | 0.464 |

Inputs:

Storage array: Unity 600F
Drives: 50 SSD MLC Drives
Random Read percentage: 80%

-continued

Lab Test Results:

Random Write Percentage: 20%
Read cache hit % = 0
Host IOPS = 30712
IO size: 8KB
LUNs = 48
Thread per LUN = 16
Drive utilization = 8.85% // how much drive IOPS been utilized
for the host IOPS = 30712
System saturation: 15% //how much system resources have been
utilized by the IOPS = 30712
Meta data service response time = 0.0069 ms
//Cache can handle most of the data
Process steps:

STEP-3:
Queue length = 0.097
STEP-4:
not applicable
STEP-5:
no calibration/adjustment required as queue length is less
STEP-6:
EFD/SSD queue length = 0.052
STEP-7:
queue length is less than water mark, so no need for an adjustment.
STEP-8:
Disk Response Time = 1.647
STEP-9:
Minimum read cache response time = 0.11
//these values are for Unity 600
Minimum write cache response time = 0.22
STEP-10:
Read response time = 0.145 [0.8*0.11*1.647 ]
Write response time = 0.22
Average response time = 0.18 [ (0.2*0.22)+0.145]
STEP-18: // this values are after applying calibration, try to match
with test results
Sequential read adjustment factor = 0
Sequential write adjustment factor = 0
Random read adjustment factor = 0.408
Random write adjustment factor = 0.206
STEP-19:
Meta data service response time = 0.0069
Meta data response time = queue length * Meta data service
time = 0.097 * 0.0069 = 0.00067
STEP-20:
Random read adjustment factor = 0.408
Random write adjustment factor = 0.214
STEP-21:
Total read adjustment factor = 0.327
Total write adjustment factor = 0.042
STEP-22:
Average read response time = 0.47
Average write response time = 0.26
Average response time = 0.54 ms As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure, hi this regard, each block in the flowchart or block diagrams may represent a module, segment, or portion of code, which comprises one or more executable instructions for implementing the specified logical function(s). It should also be noted that in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations wall be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A method, comprising:
   defining, by processing circuitry, a data storage system being designed;
   defining, by processing circuitry, a first workload for the data storage system, wherein the first workload includes a first IOPS (input-output operations per second) requirement and respective percentages of read and write IO (input-output) requests, the first workload being defined by at least one of: a simulated real-world workload, historical customer information, default application information, and customer input;
   applying, by processing circuitry, the first workload to the data storage system, thus defining a IO request queue length; and
   determining, by processing circuitry, a response time for handling an IO request at the data storage system, wherein the said determination is based on the IO request queue length, the respective percentages of read and write IO requests, a service time relating to servicing of an IO request by a data storage device of the data storage system, a read cache hit response time and a write cache hit response time associated with a cache of the data storage system;
   wherein the IO request queue length is defined as a numerical value; and
   wherein applying the first workload to the data storage system, thus defining a IO request queue length, comprises:
      generating a first value corresponding to a ratio of the first IOPS requirement to a total potential IOPS associated with one or more data storage devices of the data storage system; and
      determining a second value corresponding to a ratio of the first value to one minus the first value, wherein the second value describes the IO request queue length.

2. The method as claimed in claim 1, wherein defining the data storage system comprises defining a type of data storage device in the data storage system to handle IO requests.

3. The method as claimed in claim 1, wherein defining the data storage system comprises defining a storage tier in the data storage system that possesses a particular level of performance to handle IO requests.

4. The method as claimed as claimed in claim 1, wherein the IO request queue length is defined as a numerical value; and
   wherein applying the first workload to the data storage system, thus defining a IO request queue length, comprises:
      generating a first value corresponding to a ratio of the first IOPS requirement to a total potential IOPS associated with one or more data storage devices of the data storage system;
      determining a second value corresponding to a ratio of the first value to one minus the first value;
      determining that the first value exceeds a first threshold;
      in response to the said determination that the first value exceeds the first threshold, generating a third value corresponding to a base ten logarithm of the second value;
      producing a fourth value corresponding to a factors time the third value; and
      determining a fifth value corresponding to the fourth value minus one, wherein the fifth value describes the IO request queue length.

5. The method as claimed in claim 1, wherein the data storage system comprises solid state devices to handle IO requests; and
   wherein applying the first workload to the data storage system, thus defining a IO request queue length, comprises:

generating a first value corresponding to a ratio of the first IOPS requirement to a total potential IOPS associated with one or more data storage devices of the data storage system;

determining a second value corresponding to a ratio of the first value to one minus the first value;

reducing the read IO percentage by a factors time the read IO percentage;

reducing the write IO percentage by a factors time the write IO percentage;

summing the reduced read IO percentage and the reduced write IO percentage; and determining a third value corresponding to a product of the summed IO percentage and the second value, wherein the third value describes the IO request queue length.

6. The method as claimed in claim 1, further comprising:
determining whether the IO request queue length is greater than a cache flush threshold, wherein the cache flush threshold represents a level at which the cache flushes data therefrom; and
when the IO request queue length is greater than the cache flush threshold, increasing the request queue length by a factors time the IO request queue length.

7. The method as claimed in claim 1, wherein determining the response time includes generating a disk response time corresponding to a product of the service time and one plus the IO request queue length.

8. The method as claimed in claim 7, wherein determining the response time includes generating a read response time corresponding to a product of the read IO requests percentage and the read cache hit response time and one minus a read cache hit percentage and the disk response time.

9. The method as claimed in claim 8, wherein determining the response time includes generating a write response time corresponding to the write cache hit response time.

10. The method as claimed in claim 9, wherein determining the response time includes producing a product of the write response time and the write IO requests percentage and summing the product with the read response time to produce the response time.

11. The method as claimed in claim 1, further comprising:
determining initial read and write adjustment factors, wherein the read and write adjustment factors are based on system processor utilization and disk utilization.

12. The method as claimed in claim 11, further comprising:
determining a metadata IOPS service time; and
based on the IO request queue length and the metadata IOPS service time, determining a metadata IOPS response time.

13. The method as claimed in claim 12, further comprising:
based on the initial read and write adjustment factors and the metadata IOPS response time, determining final read and write adjustment factors.

14. The method as claimed in claim 13, further comprising:
adjusting the response time by the final read and write adjustment factors.

15. An apparatus, comprising:
memory; and
processing circuitry coupled to the memory, the memory storing instructions which, when executed by the processing circuitry, cause the processing circuitry to:
define a data storage system being designed;
define a first workload for the data storage system, wherein the first workload includes a first IOPS (input-output operations per second) requirement and respective percentages of read and write IO (input-output) requests, the first workload being defined by at least one of: a simulated real-world workload, historical customer information, default application information, and customer input;
apply the first workload to the data storage system, thus defining a IO request queue length; and
determine a response time for handling an IO request at the data storage system, wherein the said determination is based on the IO request queue length, the respective percentages of read and write IO requests, a service time relating to servicing of an IO request by a data storage device of the data storage system, a read cache hit response time and a write cache hit response time associated with a cache of the data storage system;
wherein the IO request queue length is defined as a numerical value; and
wherein applying the first workload to the data storage system, thus defining a IO request queue length, comprises:
generating a first value corresponding to a ratio of the first IOPS requirement to a total potential IOPS associated with one or more data storage devices of the data storage system; and
determining a second value corresponding to a ratio of the first value to one minus the first value, wherein the second value describes the IQ request queue length.

16. A computer program product including a set of non-transitory, computer-readable media having instructions which, when executed by processing circuitry, cause the processing circuitry to perform a method, the method comprising:
defining a data storage system being designed;
defining a first workload for the data storage system, wherein the first workload includes a first IOPS (input-output operations per second) requirement and respective percentages of read and write IO (input-output) requests, the first workload being defined by at least one of: a simulated real-world workload, historical customer information, default application information, and customer input;
applying the first workload to the data storage system, thus defining a IO request queue length; and
determining a response time for handling an IO request at the data storage system, wherein the said determination is based on the IO request queue length, the respective percentages of read and write IO requests, a service time relating to servicing of an IO request by a data storage device of the data storage system, a read cache hit response time and a write cache hit response time associated with a cache of the data storage system;
wherein the IO request queue length is defined as a numerical value; and
wherein applying the first workload to the data storage system, thus defining a IO request queue length, comprises:
generating a first value corresponding to a ratio of the first IOPS requirement to a total potential IOPS associated with one or more data storage devices of the data storage system; and
determining a second value corresponding to a ratio of the first value to one minus the first value, wherein the second value describes the IO request queue length.

* * * * *